United States Patent [19]
Herman

[11] Patent Number: 4,592,147
[45] Date of Patent: Jun. 3, 1986

[54] ELECTRICALLY ACTUATED ANGULAR ORIENTATION INDICATING DEVICE

[76] Inventor: Robert D. Herman, 4720 S. Greenwood, Chicago, Ill. 60615

[21] Appl. No.: 654,867

[22] Filed: Sep. 27, 1984

Related U.S. Application Data

[63] Continuation-in-part of Ser. No. 651,675, Sep. 18, 1984, which is a continuation-in-part of Ser. No. 499,345, May 31, 1983, abandoned.

[51] Int. Cl.$^4$ .............................................. G01C 9/06
[52] U.S. Cl. ........................................ 33/366; 33/344; 33/392; 33/402
[58] Field of Search ................. 33/366, 396, 344, 391, 33/396, 401, 402; 340/689

[56] References Cited

U.S. PATENT DOCUMENTS

| | | | |
|---|---|---|---|
| 723,526 | 3/1903 | Hein | 33/366 |
| 3,359,550 | 12/1967 | Christensen | 33/366 X |
| 3,657,551 | 4/1972 | Lingert et al. | 33/366 |
| 4,159,577 | 7/1979 | Bergkvist | 33/366 |
| 4,253,242 | 3/1981 | McInerney | 33/366 |
| 4,375,727 | 3/1983 | McAdams et al. | 33/366 |
| 4,467,527 | 8/1984 | North et al. | 33/366 |

Primary Examiner—William D. Martin, Jr.
Attorney, Agent, or Firm—Alexander, Unikel, Bloom, Zalewa & Tenenbaum, Ltd.

[57] ABSTRACT

A chamber filled with an oscillation damping liquid has a non-magnetic plumb bob suspended from an upper portion of the chamber and a radiated beam path traverses the chamber below the suspension point of the freely suspended plumb bob. The beam path and plumb bob are arranged in a desired relationship whereby in order for the suspending member of the plumb bob to completely block the beam path the chamber, or the body on which it is mounted, must be in a desired predetermined position, such as a true horizontal or a true vertical position. An electric power source and circuitry is provided to operate in response to blocking of the beam path to provide a desired electrical output indicating the desired predetermined position has been achieved and is being maintained. The electrical output may be used to operate visual or aural indication emitting device to notify the user when the desired position is achieved. A desirable application is mounting one or more chambers or detectors to an elongated body appropriate for use as a builder's level.

15 Claims, 17 Drawing Figures

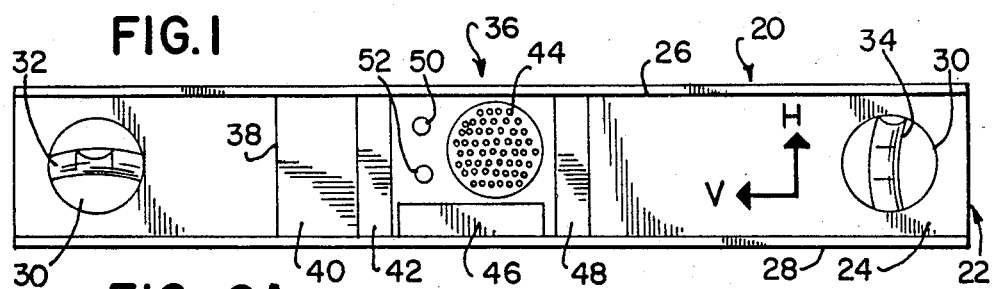
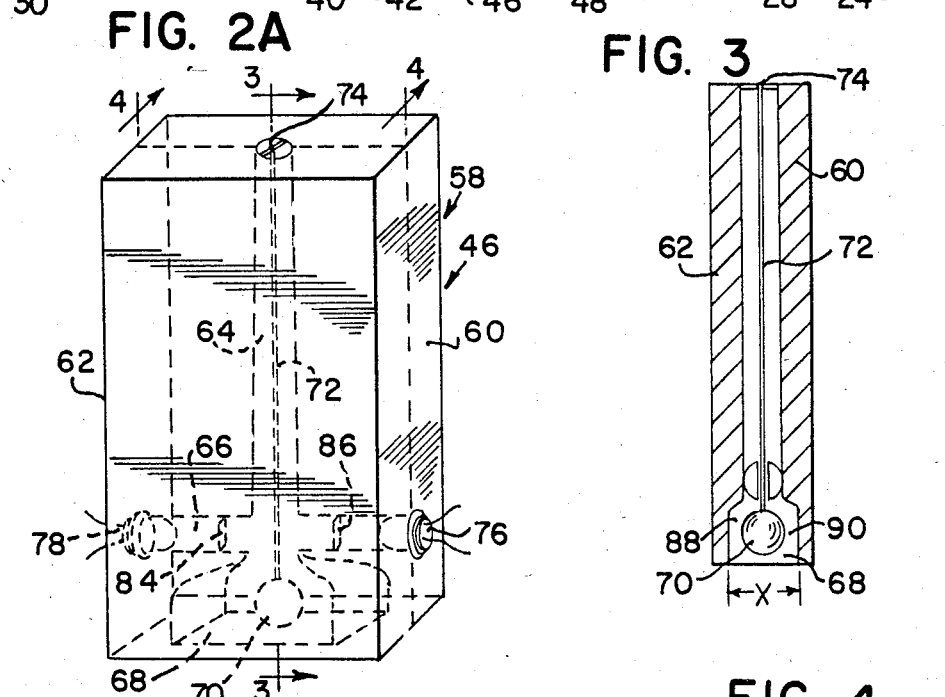
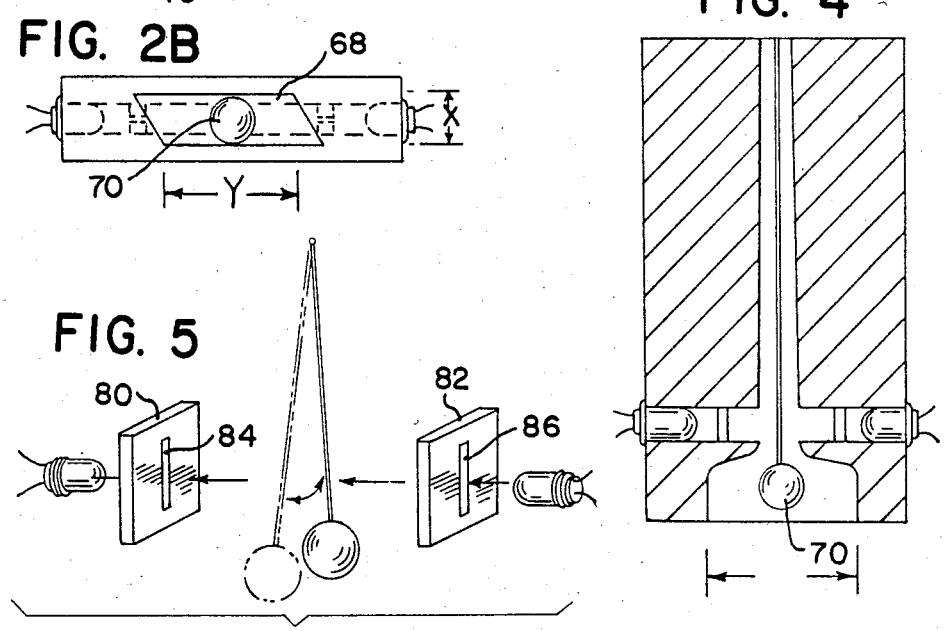

ELECTRICALLY ACTUATED ANGULAR ORIENTATION INDICATING DEVICE

RELATED APPLICATIONS

This application is a continuation-in-part of U.S. patent application Ser. No. 651,675 filed Sept. 18, 1984 which is a continuation-in-part of U.S. patent application Ser. No. 499,345 filed May 31, 1983.

BACKGROUND OF THE INVENTION

Field of the Invention

This invention relates to electrically powered instruments for determining the angular orientation of a line or plane with respect to a portion of a suspended member, such as a plumb bob, having its position determined by gravity and providing an electrical output or signal, such as a visual and/or aural indication when the line or plane has achieved a desired predetermined angular orientation.

A well known instrument for indicating the angular orientation of an object with respect to the earth's center of gravity is the conventional builder's level. The existing levels are sufficiently accurate for either construction or scientific applications and generally comprise a rectangular elongated frame, often made of metal or wood, and containing one or more curved glass tubes or vials almost completely filled with alcohol, except for a small visually discernable air space or bubble. The glass tubes are usually arranged on the frame in such a way as to indicate either a vertical or horizontal position of the object against which the frame is abutted. The mid-portion of each glass tube is provided with a pair of spaced lines which can be etched or painted on the tube. If the object is in the desired position, such as horizontal or level, the air bubble comes to rest centered within the space between the two lines.

This type of level, commonly called a "spirit level", has remained virtually unchanged for many years. Its primary deficiency is that it is difficult to read. The glass tube is typically less than two (2") inches long and the bubble is typically less than ⅜ths of an inch wide. Poor light conditions (too bright or too dim) or poor eyesight may make it difficult or impossible to read. Even if the user has good eyesight, it is still often difficult to determine when the clear bubble, in an almost clear liquid, has come to rest perfectly centered in the space between two fine lines.

Generally, the spirit level cannot be read at all at a distance further away than about eighteen inches (18"), even with good eyes under good light conditions. Yet, the spirit level must often be used in dimly lighted places where the eyes cannot easily follow it (for example, an overhead beam or a joist below the floor level). A carpenter will usually place his level at the center of a long beam (for accuracy), but then he will have to adjust the position of the beam from its end, many feet away from the level. To overcome in part the foregoing disadvantage, some of the spirit levels are provided with a small light source to illuminate the tube. However, even a flashlight will not make it readable from a distance.

Some levels, presently available on the market, have been provided with light or sound devices which indicate visually or aurally when a true horizontal or true vertical position is achieved. For example, U.S. Pat. No. 3,233,235 describes a signaling level which uses a pendulum provided with a magnet pointer for closing an electric circuit to provide a signal that a true vertical or true horizontal has been indicated.

Another form of a level using a pendulum is described in U.S. Pat. No. 4,094,073, wherein a weighted pendulum achieves a contact in an electrical circuit to give a signal for a true horizontal or vertical positioning. In another form of a level, U.S. Pat. No. 4,094,073, there is described an angle detector using a weighted pendulum.

In all of the foregoing patents, the weighted pendulum is pivotally supported on a pin. This type of pendulum support possesses an inherent amount of friction which tends to interfere with achieving of a true horizontal or true vertical positioning.

SUMMARY OF THE INVENTION

To overcome the disadvantages of the conventional spirit levels, the present invention is an improved level for determining when a desired predetermined angular orientation, such as a true horizontal or true vertical position has been achieved and, by electronic circuitry, provide a visual and/or aural indication that the desired predetermined position has been achieved to a person using the level. The improved level uses one or more attitude detectors which are engaged in a desired position with the body or frame of the level. Conventional commercially available levels generally are provided with a large, sturdy body member or frame made of metal or wood. Typically the frame is two to four feet in length and has a substantial amount of unoccupied space within the perimeters of the frame. Therefore, the attitude detectors of this invention may be readily mounted within the unused space of such frames and conventional spirit level vials or tubes can be mounted, or remain mounted, on the frame also. The present apparatus comprises four main components:

1. Attitude detectors which sense the true horizontal and/or the true vertical orientation of the detector;
2. Electronic circuitry for amplifying and controlling the small current outputs, which result when the detector achieves a predetermined angular orientation, into suitable electrical signals;
3. A visual and/or aural indicating means actuated by the suitable electric signals for communicating to the user that the detector has achieved the desired orientation; and
4. An elapsed time responsive device which automatically switches off all power from a power source when a desired predetermined "switch on" time period has elapsed A separate detector may be used for each attitude or orientation to be sensed. Thus, for example, with two detectors suitably positioned and mounted on the same body or frame the level could be used to indicate a true vertical position or a true horizontal position of the level per se or of an object, such as a construction stud or a floor joist, to which it is abutted or engaged.

The main object of this invention is to provide a level having a detector, or detectors, for indicating when the body or frame of the level has assumed a desired predetermined angular orientation and provide a visual and/or aural indication when that desired predetermined angular orientation has been achieved.

BRIEF DESCRIPTION OF THE DRAWINGS

FIG. 1 is a side view of a conventional spirit level provided with an improved attitude detecting device;

FIG. 2A is a perspective view of an attitude detector utilizing a plumb principle and how the plumb is interiorly supported;

FIG. 2B is a bottom view of the attitude detector shown in FIG. 2A;

FIG. 3 is a sectional view of the detector in FIG. 2 taken along the lines 3—3;

FIG. 4 is a sectional view of the detector shown in FIG. 2 taken along the lines 4—4;

FIG. 5 is a pictorial view of light interception by a swinging plumb;

DESCRIPTION OF THE PREFERRED EMBODIMENTS

Figure 6A:
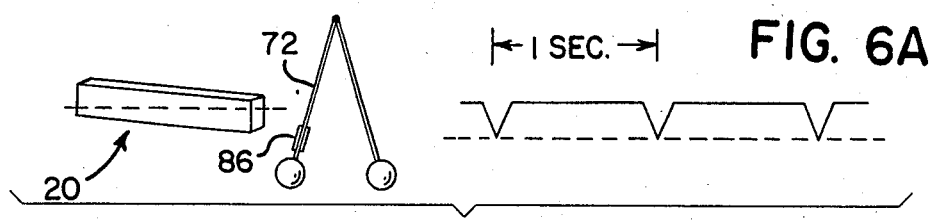
FIG. 6 is a representation of signal wave forms developed by the detector, depending on the degree of the attitude of the level.
Figure 6B:
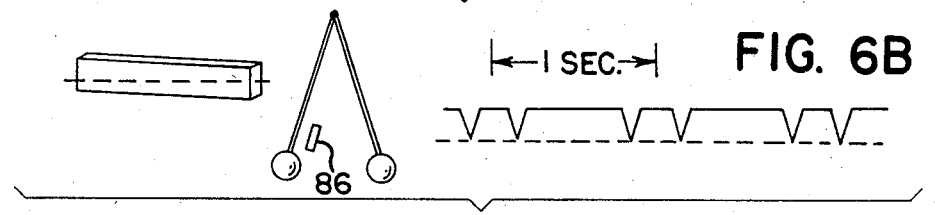
Figure 6C:
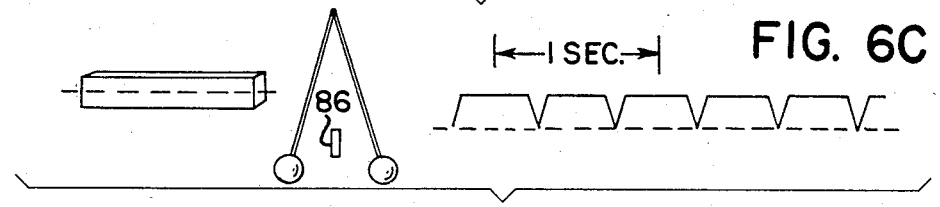
Figure 6D:
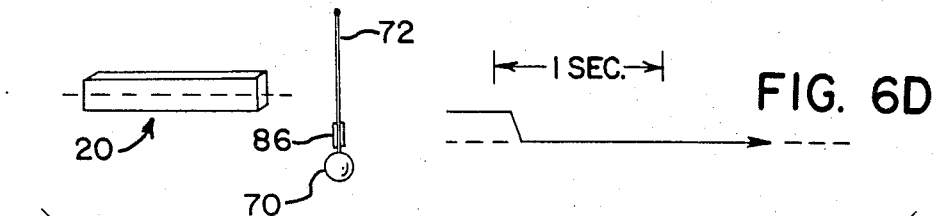
Figure 6E:
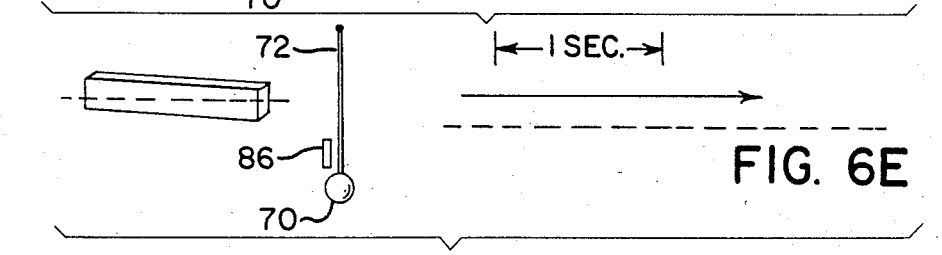

Referring to FIG. 1, there is shown a level 20 comprising a frame 22 having an "I"-beam construction having a web 24 interconnecting a pair of flanges 26 and 28. Adjacent each end of the frame, there are openings 30 provided with spirit vials 32 and 34 for respectively indicating horizontal and vertical positions. To improve the attitude sensing of the level 20 so far described, an attitude detecting apparatus 36 is incorporated in a mid section of the frame 22 and comprises a compartment 38 closed by a cover 40, a printed circuit board 42 (containing all the electronic components shown in FIG. 9), signal means in the form of a speaker 44, a vertical direction measuring detector 46, a horizontal direction measuring detector 48 and a pair of LEDs 50 and 52. The LED (light emitting diode) 50 indicated "power on" (red) and the LED 52 indicated "on true" (green). The compartment 38 contains sensitivity, tone and volume adjustments, as well as a battery (not shown). The adjustments and replacement of the battery are made by removing the cover 40. The speaker 44 is centrally mounted and projects sound forward and backward, that is on both sides of the web 24. The speaker is protected on both sides by metal grills 54. An indicia 56 is imprinted on the web 24. The purpose of the indicia 56 is to enable the user to use the level 20 correctly. For example, the level 20, as shown in FIG. 1, would be used to measure horizontal direction, as indicated by the arrowhead pointing to "H". To measure a vertical direction, the level 20 would be rotated clockwise so that the arrowhead pointing to "V" will be in a vertical position.

The heart of the invention lies in the use of the detectors 46 and 48, both of which have the same construction as shown in FIGS. 2-4. For example, the detector 46 comprises a housing 58 formed from two parts 60 and 62 formed from plastic material. As shown in FIG. 2 (A), the interior of the housing parts 60 and 62 is provided with grooves which face each other and define a vertical channel 64 and another set of grooves which define a transmission or beam path in the form of a horizontal channel 66. The channels 64 and 66 communicate with each other. The vertical channel 64 terminates in a chamber 68 in which is suspended plumb means in the form of a plumb bob 70 supported by a plumb line 72 secured to a point 74 at the top of the housing 58. The housing 58 is made from an opaque plastic, such as DELRIN (Tm), in order to shield the detector from external sources of infra-red radiation. One end of the horizontal channel 66 is provided with an infra-red emitter 76 and the other end of the channel is provided with an infra-red receptor 78. Interposed in the horizontal channel 66 is a pair of masks 80 and 82 each provided respectively with individual, vertically extending, apertures 84 and 86, as best viewed in FIG. 5. Alternatively, the two housing parts 60 and 62 may be so molded so that each housing part partially defines an aperture so that, when the housing parts are assembled together, the partially formed apertures define the complete apertures 84 and 86. The diameter of the plumb line 72, which preferably is a multi-filament thread made from black polyester material, must be equivalent to the width of the apertures 84 and 86 to effectively interrupt the transmission of light from the emitter 76 to the receptor 78. The plumb bob 70 is a stainless steel ball having a $\frac{1}{4}''$ diameter and being secured to the plumb bob 70 by gluing or by having the plumb line 72 pass through a fine tubular opening in the exact center of the ball 70. The distance from the fixed point 74 to the bottom of the ball is about two or three inches. The emittor 76 transmits an infra-red radiation which passes through both of the apertures 86 and 84 to be received by the receptor 78. The emitter 76 and the receptor 78 and the two apertures 84 and 86 must all be aligned precisely in order to create a uniform plane of relatively strong infra-red light. Each aperture is approximately 0.006 inch wides and 3/16" inch long. The plumb line 72 must be at least 0.006 inch in diameter, but accuracy will be greatest if it is not much larger than 0.006 inch (for example, 0.007 inch). A plumb line having a diameter less than 0.006 inch would not completely occlude the infra-red beam as the plumb line and the attached plumb bob swings across the transmission path existing between the apertures 84 and 86. The two apertures are about $\frac{1}{4}''$ apart and must be perfectly aligned to insure that the plane of the light they form is a full 0.006 inch wide from top to bottom. These apertures must also align properly with the plumb line 72 so that the intersection of the plumb line and the plane of light at the moment of the true vertical is a line and not a point, which would result in an imperfect interception of the transmitted light beam.

Referring to the FIGS. 2-4, the vertical channel 64 is less than ¼" in diameter so that the ball 70 cannot enter into the channel. The chamber 68 at the bottom of the housing 58 is designed to limit the motion of the ball 70 in both the x and y directions, as identified in FIGS. 3 and 4 and also as indicated in FIG. 2 (B). The parallelogram shape of the chamber 68, as shown in the bottom view of the housing 68 in FIG. 2 (B) insures that if the ball 70 swings to the extremes along the y-axis it will veer to one side and not cause a false "on true" reading. On the other hand, it should be noted that it is the movement of the plumb line 72 along the x-axis that determines the true horizontal or true vertical readings. Furthermore, it should be noted that the movement of the plumb line 72 along the x-axis, as best viewed in FIG. 3, is, in the nature of a pendulum, completely independent of the movement along the y-axis, as best viewed in FIG. 4. In other words, the plumb line may be swinging freely along the y-axis but still be at rest from the perspective of the infra-red receptor 78 which is capable of detecting motion only along the x-axis.

When the plumb line 72 shows a true vertical, for example as shown in FIG. 3, the ball 70 occupies a centered position along the x-axis with gaps 88 and 90 between the ball 70 and the walls defining the chamber 68. These gaps 88 and 90 define the limit of movement of the ball 70. The size of the gaps 88 and 90 have to be determined accurately to insure that the plumb line 72 will be allowed to move out of the beam of light just enough to completely clear the beam. The pendulum swinging of the ball 70 is restricted by the gaps 88 and 90 to prevent a protracted period of free oscillation of the plumb, that is, the maximum arc of the plumb along the x-axis is restricted to less than 1/32 inch. The combination of the horizontal channel 66, the emitter 76 and the receptor 78 constitutes beam means.

In reference to FIG. 4, it can be seen that the freedom of movement of the plumb bob 70 along the y-axis is considerably greater than along the x-axis. This permits the user to measure the horizontality of a line contained on a slightly sloped plane (for example, a roof).

Figure 7A:
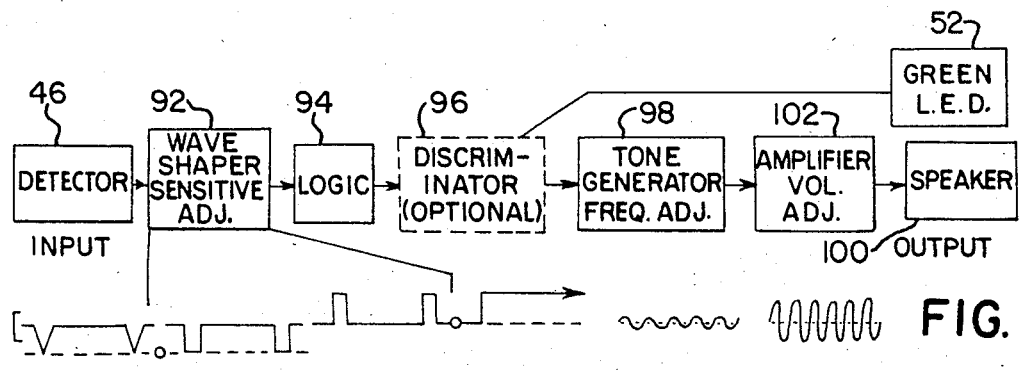
FIG. 7 is a block diagram of the electronic circuitry and the wave forms developed thereby.
Figure 7B:
Figure 8A:
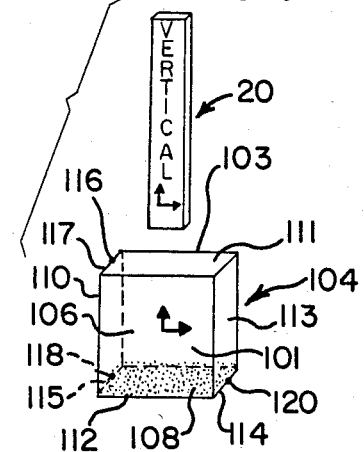
FIG. 8 shows the construction of a mercury type switch and how it functions in different attitudes of the level.
Figure 8B:
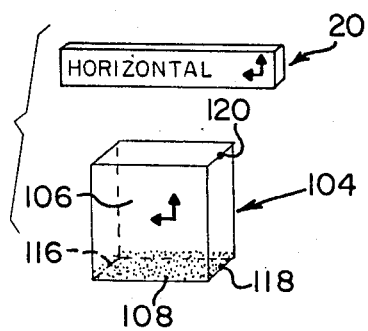
Figure 8C:
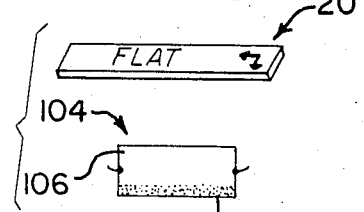
Figure 8D:
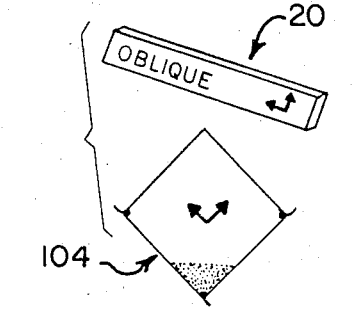

The output from the detectors, for example, detector 58, is coupled to an electronic circuit which, for this immediate discussion, is identified by a block diagram shown in FIG. 7. The output of the detector 46 is coupled to a wave shaper 92 which provides an output to a logic circuit 94. The output from the logic circuit can be further modified by connecting it to a discriminator 96 which provides one output to the green LED 52 and another output to a tone generator 98, the output of which is applied to a speaker 100 via an amplifier 102. In the alternative, the discriminator 96 can be fed directly to the green LED 52 and the tone generator 98. The effect that the electronic circuit block diagram has on shaping the output derived from the detector 46 can be visualized by the various wave forms shown in lines (A) and (B). Line (A) illustrates an "on true" signal, that is, when the plumb rythmically intercepts a centered light beam, and line (B) illustrates an "off true" signal, that is, the plumb is oscillating and intermittently interrupting an off-center light beam. The receptor 78 is an infra-red photo-transistor which will show a sudden drop in output as the plumb line passes between it and the infra-red emitter 76 which is acutally a LED (light emitting diode). However, in a true sense, this is not an instantaneous change as the plumb line progressively moves across the light beam. Though the drop in signal may take only a one hundredth of a second, the light is gradually shut out and then gradually restored causing the inverted "V" peaks shown in the wave forms shown below the detector 46.

The wave shaper 92 is an operational amplifier that functions to convert the analog output of the detector 46 to a digital pulse (either on or off).

The operational amplifier is a comparator which operates like a switch that opens (or closes) when the input signal drops below (or exceeds) a chosen threshold voltage. The comparator also serves to invert the pulses. The interruption of the light beam by the plumb causes a cessation of the output, but it is also desirable to have the same event result ultimately in the initiation of the output, so an inversion must be accomplished somewhere in the circuit. As shown in FIG. 7, lines (A) and (B), the output from the detector 46 having a spike wave form had been converted to square pulses and also inverted, as shown underneath the wave shaper 92. The logic circuit simply channels signals from the two separate detectors into one circuit.

If the discriminator 96 is employed, the output from the logic circuit 94 can be interpreted and the output from the discriminator 96 will be either a continuous pulse or an absence of pulse. These two possible outcomes will occur when the plumb has finally come to a rest, as shown in FIG. 6 (D) and 6 (E). If the plumb shows a true vertical, as illustrated in FIG. 6 (D) the light beam will be completely intercepted by the plumb line 72 and the discriminator 96 will provide a continuous pulse which is applied to the green LED 52 causing it to illuminate and the other portion of the output is applied to the tone generator 98 (provided with a frequency adjustment) and on to the amplifier 102 (provided with a volume control) and finally applied to the speaker 100 which will give an aural indication to the user.

If the plumb comes to a rest and is "off center" as shown in FIG. 6 (E), there will be no pulse generated by the discriminator, thereby informing the user that the level is "off center".

FIG. 6 shows the various attitudes which can be assumed by the level and the respective pulse patterns that result as the plumb swings back and forth, as shown on lines (A), (B), and (C).

The aperture 86 from which a plane of light is emitted is shown in various positions to correspond to the various attitudes that the level 20 may assume. It should be noted that these illustrations show the arcs of the plumb greatly exaggerated, when in reality, the arc is less than ½ of a degree.

In line (A) of FIG. 6, as the plumb line 72 occludes the aperture 86, a spike pulse is generated with a long interval as the plumb swings to the right and then swings back to the left. If the aperture 86 is in a median range, as shown in FIG. 6 (B), the plumb will generate two spike pulses which will be separated by a long interval from another pair of spike pulses. If the level 20 indicates a "true direction", the aperture 86 will be in the middle of the arc defined by the swinging plumb thereby providing an output of equally spaced spiked pulses which would be effective to provide a uniform aural output at the speaker 100. Eventually, the plumb will come to a rest in the position shown in FIG. 6 (D) to occlude the passage of the beam from the aperture 86, thereby no output is provided by the detector. In FIG. 6 (E), as previously explained, if the level 20 is "off center", a continuous beam will be transmitted, thereby providing a continuous output, which can be interpretted by the discriminator 96.

Since the level 20 is substantially constantly used during some types of construction, wherein the user senses the true direction and then puts aside the level to complete a course of construction, such as in brick laying, it would be an inconvenience for the user to constantly turn a switch on and off every time the level is picked up and placed on a side. Since a switch which is manually operable would be difficult to manipulate in cold weather a gravitationally actuable switch which will actuate the electronic circuitry only when the level is placed in a measuring position is incorporated in the level.

Figure 9:
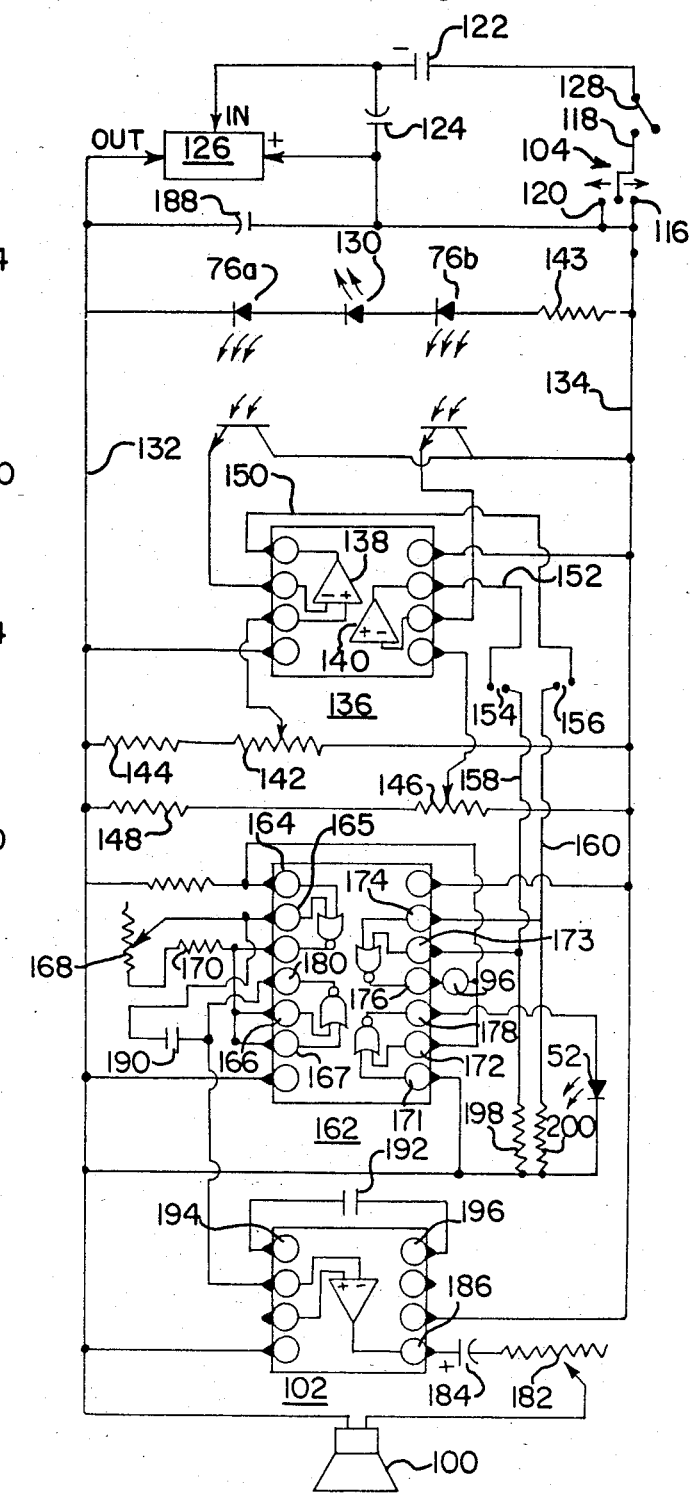
FIG. 9 is a circuit diagram for developing visual and aural indications from the outputs received from the detectors.

Referring to FIG. 8, there is shown a specially designed mercury switch which will close to provide power tO the circuit only when the level is near-horizontal or near-vertical. A mercury switch 104 is in the form of a hollow rectangular cube 105 made from non-electrically conductive material, having a chamber 106 containing a small pool of mercury 108. The cuboid 105 comprises a pair of spaced apart major walls 101 and 103 interconnected by minor walls 110-113. Corners 114, 115, and 117 are provided with mid-positioned terminals 116, 118, and 120, respectively, the terminals having portions inside the cube adapted to be contacted by the mercury. The view in FIG. 8 (A) shows how the switch 104 will rest when the level 20 is in the vertical position. FIG. 8 (B) shows the position of the switch 104 when the level is horizontal. FIG. 8 (C) shows the position of the mercury pool 108 when the level is placed flat on either of its broad sides. In this position, the mercury pool 108 does not touch any of the terminals, thereby the circuit (as shown in FIG. 9) connected to the mercury switch 104 is not energized. FIG. 8 (D) shows the position of the mercury switch 104 when the level 20 is oblique. Again, in this position, the circuit is open because the mercury touches only one contact 112.

The circuit shown in FIG. 9 uses a battery 122, preferably having an output of from 6 to 9 volts, coupled through an electrolytic capacitor 124 to a voltage regulator 126 which is designed to provide a uniform 5 volt output. The voltage regulator insures that the characteristics of the circuit do not change (including the light output of the infra-red LEDS) even as the battery begins to weaken. A manual switch 128 connects the positive terminal of the battery 122 to the terminal 118 of the mercury switch 104 so that a voltage may be applied to either of the terminals 116 and 120. The mercury switch 104 closes when the attitude of the level 20 is approximately horizontal or vertical. Current is then supplied to the entire circuit. Since the level described in FIG. 1 possesses a pair of detectors 46 and 48, there are two emitters 76a and 76b (infra-red LEDS) which activate receptors 78a and 78b (infra-red photo-transmitters) which act as switches and amplifiers. The emitters 76a and 76b are serially connected with a LED 130 and a resistor 143 (red) across leads 132 and 134. It should be remembered that one emitter and one receptor is placed in each detector housing, one detector functioning as an indicator for the "true horizontal" and the other for the "true vertical". The receptors 78a and 78b are coupled to a dual operational amplifier 136 which includes comparators 138 and 140 which effectively convert an analog input to a digital output (shaping of the pulses). A potentiometer 142 is connected in series with a resistor 144 across the LEDS 132 and 134. Similarly, a potentiometer 146 is connected in series with a resistor 148 across the leads 132 and 134. The potentiometers 142 and 146 are used to adjust the threshold voltages for the comparators 138 and 140. This effectively determines the sensitivity of the detector circuit. The outputs from the comparators 138 and 140 are connected by leads 150 and 152, respectively, through conventional mercury switches 154 and 156 to leads 158 and 160 which are coupled to a quad-NOR-gate 162. The function of each of the mercury switches 154 and 156 is to switch off the output of the detectors whenever any one of them is not in the immediate position in which it was designed to operate. This prevents stray signals from the detectors whenever their respective plumb lines 72 are slack, for example as the plumb lines lie on their side. The gate 162 performs two functions: it acts as a tone generator when it receives inputs on terminals 164-167. A potentiometer 168 in series with a resistor 170 couples the terminal 165 to terminals 166 and 167, the potentiometer 168 determining the frequency of the tone. The gate 162 also provides logic (input terminals 171-174). If the discriminator 96 is used, it is connected between terminal 176 and input terminals 164 and 172. An output terminal 178 on the gate 162 supplies current to the green LED 52. An output terminal 180 on the gate 162 is coupled to the amplifier 102 to supply a tone to the amplifier. A potentiometer 182 is connected in series with a capacitor 184 between a terminal 186 on the amplifier 102 and the speaker 100. The potentiometer 182 functions as a volume control. The red LED 130 glows whenever the power is on, when switches 128 and 104 are both closed.

A capacitor 188 is connected across the output and the positive terminal of the voltage regulator 126. A capacitor 190 is connected across the terminals 165 and 180 of the gate 162. A capacitor 192 is connected across terminals 194 and 196 on the amplifier 102. The leads 158 and 160 are connected respectively through resistors 198 and 200 to lead 132.

FIGS. 10 through 17 show improvements to the embodiments shown in FIGS. 1 through 9.

Figure 10:
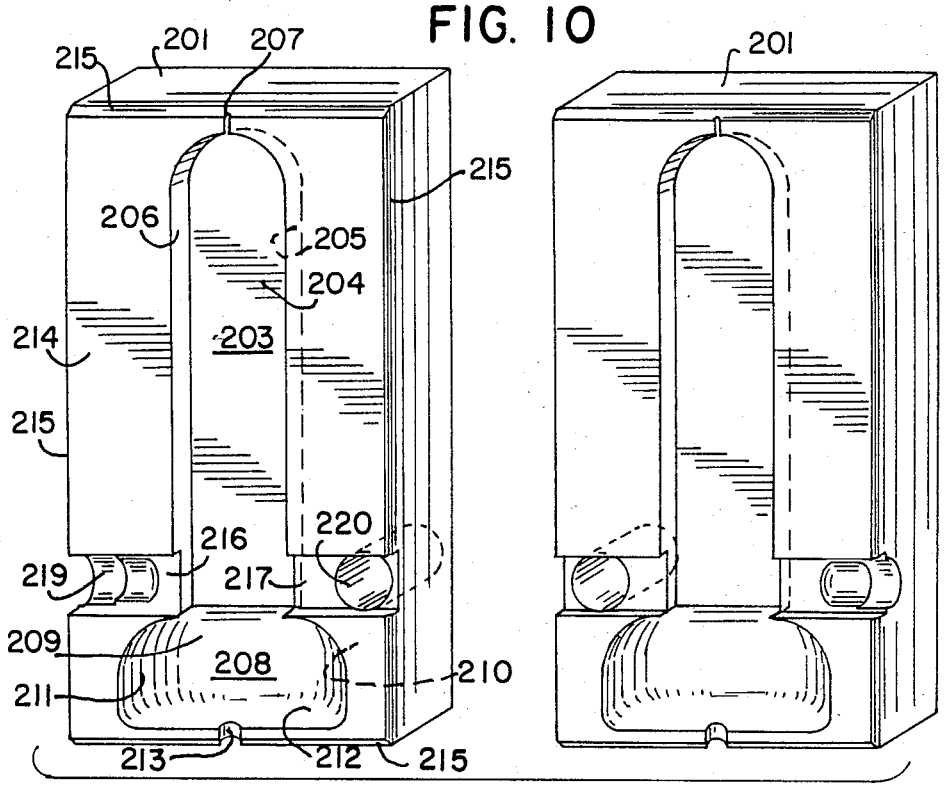
FIG. 10 is a perspective view showing two formed members used to form an improved casing for a detector of this invention.

Referring to FIG. 10, it has been found preferable to form the body or casing of the detector module or unit of two appropriately formed, such as by machining or molding, substantially mirror image halves such as members 201. As each of the members 201 are substantially identical reference numerals will just be applied to one of them on the drawing.

Member 201 is preferably formed of an opaque, non-magnetic thermoplastic, such as black acrylic plastic. Formed in member 201 is a vertically extending space or chamber 203 having a back wall 204 and a pair of side walls 205 and 206. Adjacent an upper portion of chamber 203 is provided an elongated space or opening 207 having a substantially semicircular cross section. At a lower portion of chamber 203 an enlarged chamber 208 is provided. Chamber 208 is provided with a back wall 209, a pair of side walls 210 and 211, and a bottom wall or enclosure member 212. Formed in enclosure member 212 is a semicircular filler opening 213. Member 201 has a substantially flat or planar face 214. At the outer edges of face 214 a beveled edge 215 is preferably provided.

Adjacent the top portion of chamber 208 or the lower portion of chamber 203 a vertically elongated passage means for an electrically radiated beam, such as a light beam, is provided. Means, such as slots 216 and 217, which may be milled or molded into the body 201 provide the beam passage means. Slot 216 is provided with an appropriately formed receptacle, such as semicircular opening 219, for sealingly mounting a beam emitting device. Slot 217 is provided with an appropriately formed receptacle, such as circular opening 220 formed transverse to the slot, for sealably mounting a beam receiving device.

Figure 11:
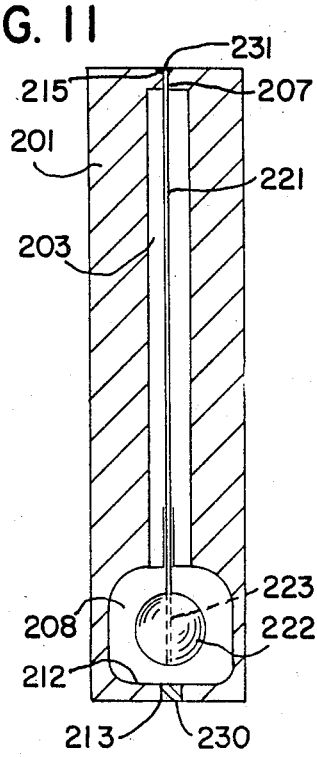
FIG. 11 is a full section view of the two members of FIG. 10 after they have been assembled with a plumb bob.
Figure 12:
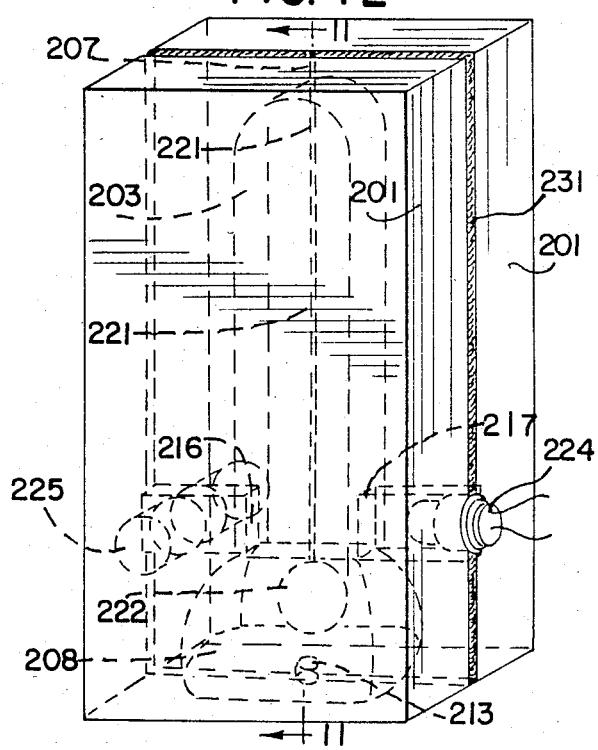
FIG. 12 is a perspective view of the two members shown in FIG. 10 in which they have been assembled with associated components of the detector mounted to the assembly.

As shown in FIGS. 11 and 12, in which FIG. 11 is a full section view after the members 201 have been assembled, during assembly a flexible suspension member 221 is sealingly engaged or adhered to openings 207 by appropriate means, such as frictional engagement, appropriate adhesives or mechanical entrapment.

A non-magnetic mass member, such as a bronze ball 222, is affixed to a lower portion of suspension member 221 and suspended within chamber 208. Suspension member 221 may be adhered to a surface portion of ball 222 or, as shown, it may be placed in or pulled through an opening 223 formed in substantially the exact center of the ball and adhered or otherwise affixed within the opening. One suitable adhesive is an alpha cyanoacrylate adhesive referred to as super glue and sold under the trademark "PERMABOND" by the Permabond International Division of Englewood, N.J. Company.

A suitable adhering medium, such as a thin plastic solvent, is preferably applied to the members 201 after they have been aligned and pressed together to form the sealingly adhered together assembled detector casing. The solvent is preferably applied in the trough formed by the beveled edges. A light emitting means, such as infra-red light emitting diode 476 is sealingly affixed or mounted in receptacle 219 in slot 216 and a light receiving means, such as infra-red photo transistor 302 is sealingly affixed or mounted within receptacle 220 of slots 217. To assure that the chambers 203 and 208 remain sealed it is preferable to fill the substantially "V" shaped void formed by the beveled edges 215 of faces 214 with a quantity or bead 231 of a substantially inert adhesive and sealant. A two part epoxy sold under the trademark "5 Minute Epoxy" by the Devcon Corporation of Danvers, Mass. has worked well. The epoxy is also placed around components 302 and 476 to assure that they are sealingly engaged with the casing.

The casing so formed is then preferably turned upside down and a suitable oscillation dampening fluid, such as an automotive brake fluid or a light mineral oil, is inserted through opening 213 into the chambers 203 and 208 and the slots 216 and 217. After the interior portions of the casing have been about 90 percent filled with the fluid a suitable sealing means, such as a plug 230, is suitably sealingly affixed or adhered in opening 213 whereby the assembled detector is fluid filled and sealed. A minimal amount of air space or void is preferably left within the chamber to allow thermal expansion of the liquid.

The aligned slots 216 and 217 form a path or slot for placing beam emitter 476 in light beam communication with beam receiver 302. The slots 216 at the point where they intersect side walls 206 of chamber 203 and the slots 217 at the point where they intersect side walls 205 of chamber 203 each form an aperture for transmitting a beam of light or radiation from side wall 206 to sidewall 205 through chamber 203 and the fluid within it for substantially forming a beam path across the chamber. Each of this pair of apertures so formed preferably has a width or horizontal dimension of about 0.008 of an inch. Also, each of these apertures preferably has a height or vertical dimension of about 0.125 of an inch. The apertures are preferably spaced between $\frac{3}{8}$" and $\frac{1}{2}$" apart and they must be substantially prefectly aligned to insure that the plane of light they define is substantially consistently the same width.

The plumb member formed by suspension member 221 and ball 222 preferably has a minimum vertical length, as measured from the bottom of the openin9 207 to the bottom of the ball 222, of about two inches to provide acceptable accuracy.

Suspension member or thread 221 must be substantially opaque to the emitted beam of radiation. A multifilament thread formed of a black polyester material or of silk are two examples of an acceptable suspension member.

Accuracy of the angular orientation detector will be greatest under the following preferred conditions: (1) the diameter of the thread 221 and the width of each of the apertures formed by slots 216 and 217 will have substantially precisely the same dimension, i.e. for example 0.008 of an inch; (2) the thread should preferably be as thin as possible and still be able to support the suspended ball without breaking under mechanical shock loadings. For example, a black polyester thread having a diameter of 0.008 of an inch has been found adequate to suspend a $\frac{1}{4}$" diameter bronze ball; (3) the thread will preferably be limp, i.e. pliable or flexible and/or not having a tendency to stiffen or take a set when placed under tension or maintained undisturbed in one position for a period of time; (4) the thread must be highly opaque to the radiated beam emitted by the beam emitter; (5) the thread must not be prone to fraying, i.e. it must under all conditions retain a sharp, well defined accurate diameter; and, lastly, (6) accuracy will be directly proportional to the distance between the point of suspension, i.e. the lower portion of suspending opening 207, and the portion of the thread which interrupts or blocks the beam of light passing from the emitter to the receiver through the pair of apertures.

The oscillation damping fluid filling chambers 203 and 208 serves to damp the oscillation motion of the plumb bob and cause it to quickly come to rest in a true vertical orientation. Also, the back walls 204 of chamber 203 and the backwalls 209 of chamber 208 limit the transverse swing of the suspension member 221 and the ball 222 with respect to the beam radiated between the apertures.

Due to the substantially greater dimension between the sidewalls 205 and 206 of chamber 203 compared to the backwalls 204 the plumb bob can be tilted or skewed in a direction of swing longitudinal to the radiated beam passing through chamber 203 between the apertures and still provide a true vertical reading, i.e. complete blocking of the beam between the apertures.

The liquid used to fill the interior of the detector casing or body must be transparent to the radiated beam. Preferably, it also will have a high boiling point, remain fluid at temperatures below freezing, have high viscosity and be non-corrosive or non-reactive with any of the materials which it contacts within the detector body to preclude deterioration of any of the materials or components of the detector.

Figure 13:
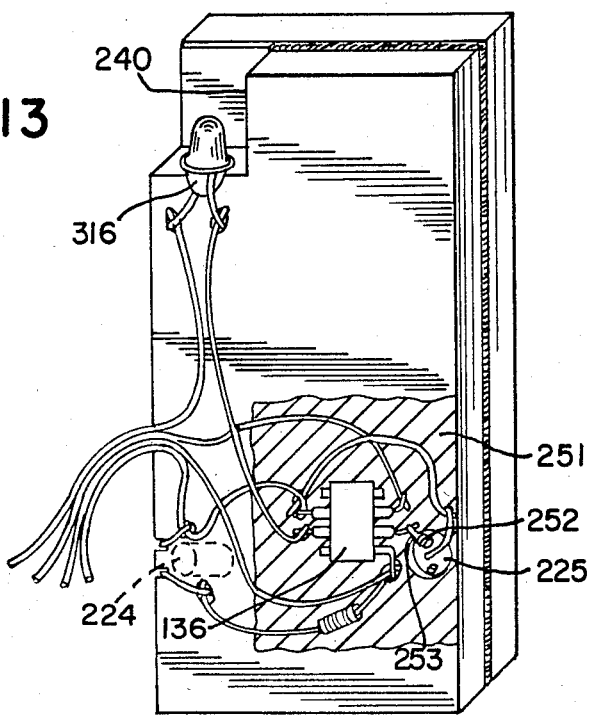
FIG. 13 is an alternate embodiment of the assembly shown in FIG. 10 showing the arrangement of electronic components on the detector casing assembly.

FIG. 13 shows an optional construction of a detector having one of the blocks having a cutout portion 240 for receiving or having mounted thereon an optional position sensitive switching means, such as a mercury switch 316. FIG. 13 also shows a preferred arrangement of electronic components mounted directly to a side portion of the detector body.

Beam emitter 476 is shown inserted into and sealed in its receptacle oriented along the longitudinal axis of the beam carrying slot and beam receiver 302 is shown placed in its receptacle and sealed in the assembled detector body.

A piece of a radiation insulative material, such as a piece of aluminum foil 251, is affixed to the side of the casing by appropriate means, such as gluing or cementing it to the outer side of the member 201. The heat reflecting side of the foil should be facing outward or away from the casing. An operational amplifier 336 is preferably cemented to the foil to provide substantially the shortest practical distance between the beam receiver 302 and the amplifier 336. A ferrite bead 252 may also be placed over the lead 253. Foil 251 serves to isolate the beam receiver 302 from stray radiation and the ferrite bead reduces the effect of induction caused by nearby currents on the lead 253.

Mercury switch 316 permits passage of a detector signal only when the detector is in substantially an upright position as shown to preclude erroneous signals when the detector is in an inoperative position, such as when it is sufficiently tilted to cause suspension member 221 to be slack.

Figure 14:
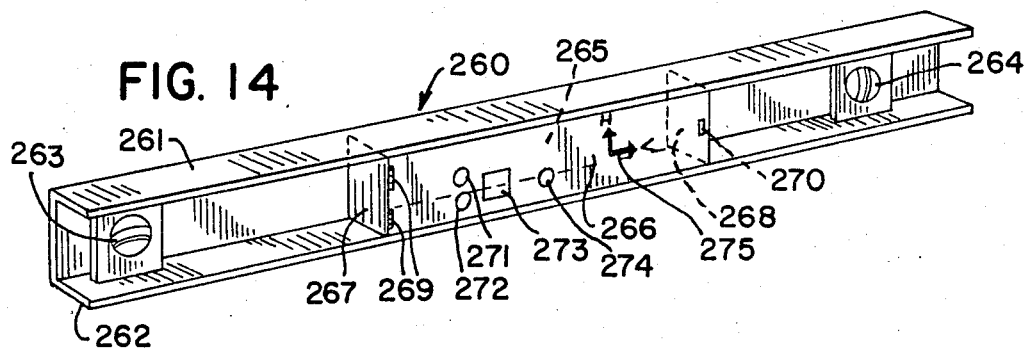
FIG. 14 is a perspective view of an improved embodiment of the level shown in FIG. 1.
Figure 15:
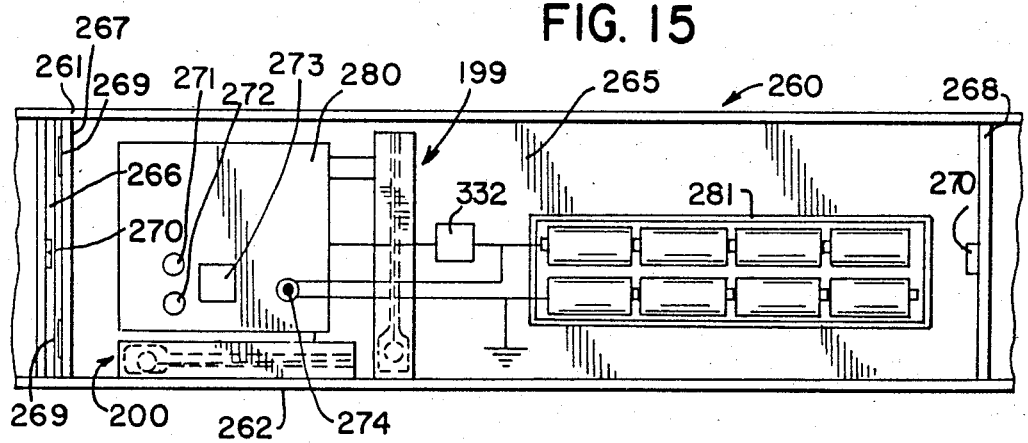
FIG. 15 is an enlarged front elevation view of the center portion of the level shown in FIG. 14 with the shield and access covering in the open position.

FIG. 14 is a perspective view showing a typical carpenter's or builder's level having the detectors of this invention and FIG. 15 is a front elevation view of the central portion of the level of FIG. 14 in which the access door is in the open position.

Level assembly 260 is comprised of a level body or frame portion 261 formed in a "U" shape and often referred to as a "channel beam". Level body 261 may be formed of a suitable material such as plastic or, preferably, aluminum. Body portion 261 has appropriate surfaces, such as surface 262, adapted for engaging or being placed on a surface of an object to be leveled or placed in a vertical position. Floor joists or wall studs, respectively, are examples of construction members typically requiring accurate placement in these horizontal or vertical angular orientations.

Typically, and preferably, such levels will be provided with a horizontally disposed conventional alcohol/air bubble vial, such as vial 263, for indicating horizontality or levelness of surface 262 and a transversely disposed alcohol/air bubble vial 264 for indicating a vertical orientation of surface 262.

Affixed within the longitudinally intermediate or central portion of channel or body 261 of level assembly 260 is a compartment 265 for housing the angular orientation indication devices and associated circuitry and components of this invention. Compartment 265 is defined on three of its longitudinal sides by the walls of the channel of the level body. At a frontal portion a shielding access door, such as plastic covered aluminum door 266 is positioned. At each end of compartment 265 a shielding end wall, such as aluminum walls 67 and 268, are provided.

Door 266 is movably affixed, such as by a hinge 269, to one of the end walls, such as wall 267 and latchingly engaged, such as by a magnet type latch 270, to the other end wall 268.

Operative or observable through door 266 are a first and a second visual indication means, such as light emitting diodes 312 and 366, a switching means, such as membrane type switch 273 and an electrical access or connection means, such as connection jack 304 adapted for receiving a suitable connecting portion (not shown) of an electrical battery recharging power source.

Also preferably included on the face of door 266 is an operation orienting indicia, such as arrow indicia 275 indicating by the arrowheads and the letters H and V, for horizontal and vertical, the position the level should be used in.

Enclosed within the shielding compartment 265 is a first horizontal detector assembly 600 and a second vertical detector assembly 700. Each of the detector assemblies is comprised of structure shown in FIGS. 10 through 12 and, optionally, FIG. 13. Detector assembly 600 is affixed to level body 261 whereby surface 262 will be substantially perfectly level along its longitudinal axis when the suspension member of the plumb bob blocks the receiver from receiving the radiated beam from the transmitter. Similarly, detector assembly 700 is mounted and affixed to frame or body 261 of level 260 whereby when surface 262 is substantially perfectly vertically oriented the suspension member within assembly 700 will place the emitter out of radiated beam communication with the receiver in the same blocking manner.

An electrical circuit is provided within compartment 266 by appropriate means, such as printed circuit board 280 mounted to frame 261 within compartment 265.

An appropriate source of electric power such as, as shown, a battery pack 281 comprised, in this example, of eight rechargeable nickel-cadmium electric batteries of about 1.25 volts each, is provided within component 265.

A voltage regulating means, such as voltage regulator 332, is connected between battery pack 281 and printed circuit board 280 to protect the circuit and its various electronic components from being adversely affected when the input jack 304 is connected with a conventional appropriate charging means to charge the rechargeable batteries of battery pack 281. The voltage regulator also serves to prevent changes in circuit characteristics and sensitivity which would otherwise occur as batteries wear down and input voltage drops. Of course, the batteries could be of the replaceable, non-rechargeable type, such as 1.5 volt alkaline batteries, and such batteries could be readily changed by opening door 266. Preferably, the recharging means will be of the type which can be plugged into a wall outlet or, by manual or automatic switch over, into alternate means, such as the cigar lighter of a vehicle, to readily recharge the batteries when utility generated current may not be available.

Figure 16:
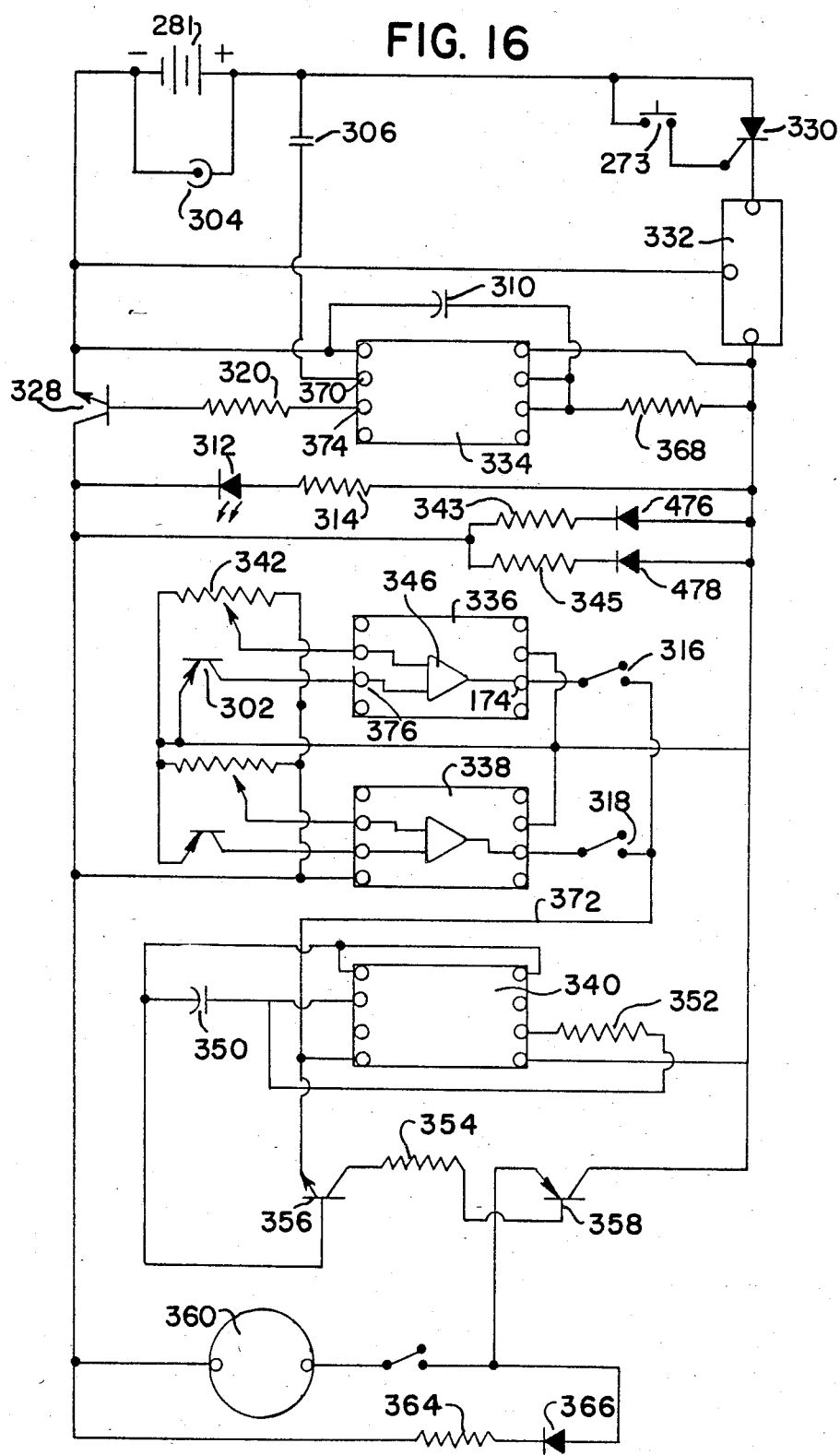
FIG. 16 is a schematic of the circuitry of the level shown in FIGS. 14 and 15.

FIG. 16 shows in schematic form the electrical operation of the electronic angle orientation indication device of this invention. The list below identifies the electrical components by reference numeral, which were used in one embodiment.

| Reference Numeral | LIST Electrical Component |
|---|---|
| 273 | Membrane type momentary switch |
| 281 | Batteries |
| 302,302' | Infrared phototransistor PNP (General Electric L14H2) |
| 304 | Adapter plug for recharger unit |
| 306 | Capacitor, .005 microfarad, disc type |
| 310 | Capacitor, 22 microfarad electrolytic, 6 volt minimum |

-continued

| Reference Numeral | LIST Electrical Component |
|---|---|
| 312 | Light emitting diode (LED) (General Instrument MV 64520) Green |
| 314 | Resistor, 150 ohms, ¼ watt |
| 316 | Minature mercury switch, metal case |
| 318 | Minature mercury switch, metal case |
| 320 | Resistor, 1000 ohms, ¼ watt |
| 328 | NPN transistor (General Electric 2N4401) |
| 330 | Silicon controlled rectifier (SCR) (General Electric C122A) |
| 332 | Integrated circuit voltage regulator, 5 volt, positive (Texas Instruments 7805C) |
| 334 | Integrated circuit timer (Texas Instruments NE 555P) |
| 336,338 | Integrated circuit operational amplifier #741 |
| 340 | Integrated circuit flasher (Radio Shack M3909N) |
| 342,342' | Potentiometer, 10,000 ohms |
| 343,345 | Resistor, 150 ohms, ¼ watt |
| 350 | Capacitor, 100 microfarad electrolytic, 6 volt minimum |
| 352 | Resistor, 150 ohms, ¼ watt |
| 354 | Resistor, 150 ohms, ¼ watt |
| 356 | NPN transistor (Radio Shack 2009) |
| 358 | PNP transistor (2M3906) |
| 360 | Piezo buzzer, self contained circuit |
| 362 | Slide switch (optional) |
| 364 | Resistor, 47 ohms, ¼ watt |
| 366 | Light emitting diode (Dialight #9174) Yellow |
| 368 | Resistor, ¼ watt, 2.4 Megaohms = 1 minute timer 4.8 Megaohms = 2 minute timer |
| 476, 478 | Infra-red light emitting diode (Texas Instruments TIL 32) |

In the example shown in this disclosure the power supply 281 consists of either a minimum of six alkaline batteries of 1.5 volts each or a minimum of eight rechargeable nickel-cadmium batteries with a voltage of about 1.25 volts each. The power supply voltage must not fall below 7.5 volts under full load conditions, but higher voltages (as high as 20 volts) are acceptable since the voltage regulator 332 maintains the circuit voltage at a constant 5 volts. If, for example, an eight cell battery holder is provided, virtually any type cell may be used (standard, alkaline, or rechargeable), and a battery charger may be plugged into the circuit at 304 with no risk to the circuit and without the necessity of removing batteries from the unit. Momentary switch 273, a membrane type switch impervious to moisture and dust, when manually stimulated to the "on" mode triggers a silicone controlled rectifier 330 which acts as the main switch for the entire circuit. Once triggered, SCR 330 will remain in the "on" state provided that a certain minimum current continues to flow through it. It will, however, eventually return to the "off" state, shutting off all current to the circuits, as will be explained below. Between the SCR 330 and the remainder of the circuit lies voltage regulator 332 which maintains voltage throughout the rest of the circuit at about five volts. When switch 273 is momentarily closed the SCR 330 turns "on" and an accompanying momentary drop in voltage is transmitted to the trigger 370 of integrated circuit timer 334 through disc capacitor 306. The timer 334, having now been energized by the closing of SCR 330 and triggered by a pulse through capacitor 306, turns "on" for a predetermined period of time which is a function of the ratio between the values of capacitor 310 and resistor 368. For example, a capacitor of 22 microfarads and a resister of 2.4 megaohms will allow the timer to remain "on" for one minute, after which it will shut off. When "on", timer 334 is positively biased at terminal 374. This bias acts on the base of NPN transistor 328 causing the transistor to turn "on" and connecting the rest of the circuit with the negative side of the power supply. It should be noted that the current consumption of the timer 334 alone is insufficient to maintain the SCR 330 in the "on" state. SCR 330 remains "on" only because the timer 334 immediately causes three light emitting diodes (LEDS) 312, 476, and 478 to be energized as well by closing transistor 328. When at the end of the timing period of timer 334 the bias on the base of transistor 328 terminates, the transistor 328 shuts "off" (opens), all current to the rest of the circuit is terminated, leaving the timer 334 the only component of the circuit still energized. However, its power consumption is insufficient to maintain SCR 330 in the "on" state, so SCR 330 shuts "off" and no current flows thereafter through any part of the circuit. The user of this level, therefore, need only start its operation with a momentary touch of switch 273 and the electronic level will shut itself off after a predetermined, selectively adjustable period of time.

When the desired, predetermined angular orientation of a detector module or unit has been achieved and is being maintained the electronic circuit will preferably produce an indication or signal which is both visually and aurally discernable and easily distinguishable from ambient light and background noise. To this end a flashing light and pulsating clearly audible tone are felt desired. This is achieved through the use of an integrated circuit flasher 340. Resistor 352 and capacitor 350 determine the rate of this pulsation. The output of flasher 340 is insufficient, however, to power both a bright indicator light (LED 366) and a tone generator (piezo buzzer 360), and transistors 356 and 358 are therefore used to amplify this output. Flasher 340 can produce the pulses that result in a signal to the user only when it is itself energized, and it depends for its power on the outputs of the two operational amplifiers 336 and 338 which are found on the housing or case of the horizontal and vertical detector assemblies 600 and 700, respectively. The outputs of the two operational amplifiers 336 and 338 may pass first through mercury switches 316 and 318, respectively, and then through lead 372 to the IC flasher 340. Each of the mercury switches which are also attached to the detector assemblies is closed only when the housing to which it is attached is roughly in the proper position to give a "true" report. It insures that no false or erroneous report will result when a detector is, for example, lying on its side or back. The meaning of this will become clear below.

It can be seen that when SCR 330 has been turned "on", and until the period of the timer has elapsed, any output from operational amplifiers 336 and 338 will result in a pulsating signal to the user. Since the operation of all the detector circuits (however many there may be) is identical, detector assembly 600 will be described as an illustrative example. Operational amplifier 336 contains a comparator 346 which outputs at 474 whenever the current received at its input 376 falls below a selected threshold. The threshold is selected by adjusting potentiometer 342. Within the detector radiation from infra-red emitter 476 falls upon infra-red phototransistor 302 producing a relatively constant though feeble current at terminal 376 on operational amplifier 336. When SCR 330 is "on" and sufficient infra-red light from the emitter 476 is falling on the detector 302, operational amplifier 336 will not output and the electronic level will not signal to the user. However, when plumb line 221 interrupts this beam of infra-red between apertures 216 and 217, such as shown in FIG. 12, the current output of phototransistor 302 falls below the selected threshold and a signal is produced. The threshold may be so adjusted that partial occlusion of the beam of infra-red will not sufficiently reduce the output of phototransistor 302 to drop this output below the threshold. Hence, nothing short of total occlusion will result in a signal.

The detector assembly is positioned in the body or frame of the level 260 so that this complete occlusion will occur at precisely the moment when the surface 262 of body or frame 261 is in a "true" horizontal (or vertical or other desired or predetermined) attitude.

Resistors 314, 343, 345, and 364 are all employed to regulate the current through LEDs; resistors 320 and 354 are employed to avoid excessive current consumption in the biasing of their respective transistors.

The mercury switches 316 and 318 can often be eliminated because the ball 222, as best shown in FIG. 11, is far too large to move out of chamber 208 into chamber 203 whereby the ball itself could block the beam between the apertures. As the ball, by size alone, is precluded from leaving chamber 208 and because when the ball lays against a sidewall or backwall of chamber 208 due to the detector being in a non-operative position the pliable thread is held reasonable taut and cannot practically rise far enough in chamber 203 to block the light beam, use of the mercury switches 316 and 318 may often be superfluous.

Therefore, if resistor 354 of FIG. 16 is replaced with a resistor of 270 ohms and mercury switches 316 and 318 are replaced with switchin9 diodes, such as IN 914, the level will operate satifactorily without the mercury switches.

A switch, such as switch 362, may optionally be included in the circuit to provide a means of manually shutting off the buzzer 360.

As disclosed above, the improved device for indicating achievement of a desired predetermined angular orientation of a chamber enclosing a suspended member within it, or of a body to which the chamber is mounted or engaged, provides an efficient, effective means for enabling adjustment of the angular orientation of an object at a point substantially remote from where the device is located on the object because the adjuster is informed at the remote location when the object has achieved the desired predetermined angular orientation, such as a substantially true horizontal or a true vertical orientation or position.

The longitudinal axes of the rectangular cross-section beam shaping apertures which define the beam path projected across the chamber from the beam emitter to the beam receiver are arranged parallel to each other and are aligned with the point of suspension of the blocking means in the same plane. Therefore, when the suspending thread of the plumb bob completely blocks the beam path to prevent light emitted by the beam emitter from being received by the beam receiver the plane in which the longitudinal axises of the slots and the point of connection lie is a true vertical plane. If the chamber is affixed to a level body in an orientation which is parallel to the object contacting surface of the body, such as detector assembly 700 in FIG. 15, the level will indicate a true vertical position. If the chamber is arranged so the plane formed by the longitudinal axis of the slots and the point of connection of the blocking member in an orientation which is normal or perpendicular to a longitudinal axis of the object contacting surface, such as detector 600 of FIG. 15, the level will indicate a true horizontal position.

It will be apparent that a plurality of other desired predetermined angular orientations could be determined in the same manner just by the position with which the detector chamber is affixed to the carrier or level body. For example, one or more detector members could be affixed to a body in a manner or at an angular relationship which would indicate when the body has achieved an angular orientation with respect to a true horizontal position of, say, 30°, 45°, or 60°, or any other desired angular position.

The chamber is liquid filled to damp oscillations of the plumb bob in the sealed chamber whereby the blocking means takes less time to arrive at a stable position. Also the plumb bob is formed of non-magnetic materials to enable the level body or chamber to be engaged with a metal member, such as a steel wall stud commonly used in commercial construction, by a magnet. The frame of the level could be of steel and could be magnetically engageable to a steel object without detrimental effect to the accuracy of these detectors. The chamber in which the detector, or detectors, are housed shield the device from ambient radiation and electrical fields to prevent such stray radiation from having a detrimental effect on the consistency or accuracy of the detectors.

What is claimed is:

1. A device for indicating a desired predetermined angular orientation, said device comprising, in combination:

a liquid filled chamber having an upper portion, a lower portion, a first side portion, and a second side portion;

a radiated beam path extending from said first side portion to said second side portion;

means for emitting a beam along said beam path from said first side portion to said second side portion;

means at said second side portion for receiving said emitting beam;

means of a size equal to said emitted beam for blocking said beam path for preventing said radiated beam emitted by said emitting means from being received by said receiving means, said blocking means being swingingly suspended from a connecting portion of said upper portion of said chamber;

electric powered indicating means actuatable in response to said blocking means blocking said beam path for maintaining said receiving means out of radiated beam communication with said emitting means; and said beam path and said connecting portion of said upper portion of said chamber from which said blocking means is suspended being arranged in a desired relationship with respect to each other whereby when said blocking means maintains a stable position blocking said beam path said chamber is in a desired, predetermined angular orientation and said electric powered indicating means produces an electrical output in response to said beam being blocked.

2. The invention defined in claim 1 in which said chamber is enclosed within a substantially opaque casing.

3. The invention defined in claim 1 in which said beam path is defined by and extends between a first aperture in said first wall portion of said chamber and a second aperture in said second wall portion of said chamber.

4. The invention in claim 3 in which said beam emitting means emits a beam of infra-red light through said first aperture to said second aperture and said beam of light defines said beam path in said chamber.

5. The invention defined in claim 4 in which each said first aperture and said second aperture is an elongated slot of equal size, and rectangular in cross section, each of said slots have a longitudinal axis and said longitudinal axes are substantially parallel with each other.

6. The invention defined in claim 5 in which said connecting portion of said upper portion of said chamber is located at a point above and substantially perfectly aligned with said longitudinal axes of said slots whereby when said blocking means is blocking said beam path said longitudinal axes of said slots are aligned with said connecting portion of said blocking means in a true vertical position.

7. The invention defined in claim 6 in which said blocking means is a plumb bob and said connecting portion at said upper portion of said chamber is a connection opening formed in said upper portion of said chamber.

8. The invention defined in claim 7 in which said plumb bob is comprised of a suspension member having a first end sealingly affixed to said connection opening and a second end extending below said beam path and affixed to a mass member for maintaining said mass member suspended in said lower portion of said chamber.

9. The invention defined in claim 8 in which said suspension member is an elongated pliable member circular in cross section and having a substantially constant diameter throughout its length and said beam path as defined by said apertures has a width dimension substantially equal to or less than said diameter position of said suspension member.

10. The invention defined in claim 9 in which said mass member is a sphere formed of a non-magnetic material.

11. The invention defined in claim 1 in which said indicating means is a light emitting diode switched on in response to said beam path being blocked.

12. The invention defined in claim 1 in which said indicating means is a piezo buzzer switched on in response to said beam path being blocked.

13. The invention defined in claim 1 together with a body member having an elongated planar surface having a longitudinal axis for engaging a surface of an object and said chamber is affixed to said body member in a desired angular orientation with respect to said planar surface to indicate when said engaged object is oriented in said desired angular orientation.

14. The invention defined in claim 13 in which said chamber is affixed to said body whereby said blocking means blocks said beam path when said blocking means downwardly depends from said connecting portion of said upper portion of said chamber in an orientation substantially normal to said longitudinal axis of said planar surface of said object.

15. The invention defined in claim 13 in which said chamber is affixed to said body whereby said blocking means blocks said beam path when said blocking means downwardly depends from said connecting portion of said upper portion of said chamber in an orientation substantially parallel to said longitudinal axis of said planar surface of said object.

* * * * *